United States Patent Office 2,988,447
Patented June 13, 1961

2,988,447
COPPER BASE BRAZING ALLOY AND MIXTURES

George S. Hoppin, III, Hamilton, Ohio, assignor to General Electric Company, a corporation of New York
No Drawing. Filed Dec. 31, 1958, Ser. No. 784,094
6 Claims. (Cl. 75—159)

This invention relates to copper base brazing alloys including nickel and which may include indium and silicon and to their mixtures in powder form with other alloy powders for the brazing of wide gaps.

The commercially available materials currently used for high temperature brazing alloys are principally nickel, silver, gold or palladium base alloys. Of these, the nickel base brazing alloys including silicon and boron or chromium, silicon and boron are most frequently used for elevated temperature applications.

In attempting to achieve satisfactory brazed joints between some of the newly developed elevated temperature, nickel base alloys, I noticed damaging attack on and embrittling of the parent material to the point where such material could not be used as a structural member.

Therefore it is an object of this invention to provide a brazing alloy which would virtually eliminate embrittlement and attack on those materials susceptible to such damage.

Another object is to provide a brazing mixture capable of bridging, during brazing, relatively wide gaps between materials normally susceptible to attack and embrittlement by currently used brazing alloys and mixtures.

A further object is to provide a copper base brazing alloy including nickel and which may include silicon and indium suitable for service at elevated temperatures.

Briefly stated, in accordance with one aspect of my invention, I provide a copper base brazing alloy comprising in percent by weight about 20–40 nickel, up to about 10 indium, up to about 4 silicon, with the balance essentially copper. In addition, I provide a brazing mixture for use in bridging relatively wide gaps between materials to be joined, comprising about 75–95 percent of my above-mentioned copper base brazing alloy.

One of the newly developed high strength, nickel base alloys for elevated temperature service, and which I will refer to herein as René 41, is a high aluminum, high titanium bearing alloy of the following composition range in percent by weight:

| Carbon | 0.06–0.20 | Titanium | 3.0–3.3 |
| Chromium | 18–20 | Aluminum | 1.5–1.9 |
| Cobalt | 9–12 | Boron | up to 0.02 |
| Molybdenum | 9–10.5 | Nickel | balance |

When brazing alloys of the nickel-chromium-silicon-boron or nickel-silicon-boron types, previously found practical in brazing elevated temperature iron base or cobalt base alloys, were used to braze together René 41 alloy, severe embrittlement of and attack on the René 41 resulted. The magnitude of the damage was such that the article made from René 41 could not be used in such a condition as a structural member.

Such embrittlement appeared to be caused by penetration of constituents of the brazing alloy between the grains of the René 41. Thus there was a continuous, brittle grain boundary network which led to fractures of the René 41 material between its grains at stress levels far lower than those normally needed to cause fracture of René 41.

The ease of such penetration or diffusion of brazing alloys is a function of the size of atoms involved. The following list gives the atomic radii in angstrom units of several brazing alloy constituents:

| Boron | 0.88 | Nickel | 1.24 |
| Silicon | 1.17 | Indium | 1.62 |

Boron, being a small atom, diffuses most rapidly; silicon will also do so more sluggishly. However, I noted that since the indium atom is larger than the nickel atoms comprising the matrix of René 41, it is most difficult for indium atoms to diffuse into, or penetrate through, the nickel lattice. Thus indium alloys do not embrittle such nickel base alloys as René 41, whereas alloys containing boron or relatively large amounts of silicon result in embrittling action.

In the development of my copper base brazing alloy in its broad range, I initially selected the following series of alloys and melted additional specimens as a preferred range for study:

Table I
[Nominal composition in percent by weight]

| Example | Cu | Ni | In | Si |
|---|---|---|---|---|
| H 42 | Balance | 35 | 15 | |
| H 45 | do | 37 | 10 | |
| H 46 | do | 39 | 5 | |
| H 47 | do | 40 | 3 | |
| H 48 | do | 39 | 5 | 2 |
| H 49 | do | 40 | 5 | 1 |
| H 50 | do | 35 | 5 | |
| H 51 | do | 35 | 5 | 1 |
| H 52 | do | 30 | 5 | |
| H 55 | do | 30 | 0 | 4 |
| H 56 | do | 30 | 2 | 3 |
| H 57 | do | 30 | 3 | 2 |
| H 58 | do | 30 | 4 | 1 |

In initial processing, I noted that even argon-melted material contained excessive amounts of oxide inclusions. Therefore I eliminated such inclusions by vacuum melting techniques applied to all of my alloys melted thereafter.

In order to determine which of my alloys were suitable for elevated temperature service, I determined the solidus and liquidus temperatures. The solidus temperature refers to the temperature at which freezing of an alloy ends during cooling, or melting begins during heating under equilibrium conditions; the liquidus temperature refers to the temperature at which freezing begins during cooling or melting ends during heating under equilibrium conditions. One of the objectives of my melting the several alloys was to obtain one which had a higher solidus temperature than the approximately 1700° F. solidus temperature for H 42. All of the alloys represented in Table I, with the exception of H 42, had solidus temperatures of at least about 1800° F., and two of the alloys (H 46 and H 50) had solidus temperatures in excess of 1900° F. To assure accuracy in temperature measurements, panels on which alloys were placed for melting tests were individually thermocoupled.

Although all of my alloys shown in Table I are suitable and have advantages for various elevated temperature applications, I prefer to use the compositions of H 50, H 55 and H 56 alloys to braze René 41 because they have the best combination of properties for use with such a material. Microstructural examinations of joints brazed at about 2150° F. with the alloys of Table I showed little if any intergranular attack of René 41 material. None of the alloys of Table I embrittled René 41.

Table II illustrates average results from tensile-shear tests of René 41 lap joints brazed at about 2150° F. using my alloy in the range in percent by weight of about 35–38 nickel, about 4–10 indium with the balance essentially copper. After brazing I air cooled the test specimen and aged it for four hours at about 1650° F. As used in Table II, "ISS" means "Indicated shear strength": the maximum load divided by shear areas.

*Table II*

| Specimen | Temperature (° F.) | Maximum Load (lbs.) | ISS (p.s.i.) |
|---|---|---|---|
| A | Room | 2,060 | 35,800 |
| B | 1,000 | 1,740 | 28,200 |
| C | 1,200 | 800 | 13,800 |
| D | 1,400 | 540 | 8,950 |

The ability of a brazing alloy or mixture to bridge relatively wide gaps between pieces to be joined increases the efficiency and decreases the cost of fabrication of a brazed article. A material for bridging relatively wide spaces between pieces to be joined is generally called a "wide-gap brazing alloy." Such a material usually used as a powder, must flow well enough to wet the surface to be brazed but not be fluid enough to flow from the joint to be bridged. Therefore, in a wide-gap brazing alloy or mixture there must be a close control or balance between fluidity and sluggishness of the alloy at the temperature at which the brazing is conducted.

I conducted a series of tests on combinations of powdered brazing alloys which I had selected. Table III shows the composition ranges in percent by weight of three such powders which I have found to be practical in my mixtures.

*Table III*

| Element | H-Alloy | N-Alloy | P-Alloy |
|---|---|---|---|
| Nickel | 35–38 | Balance | Balance |
| Indium | 4–6 | | |
| Copper | Balance | | |
| Silicon | | 1.5–2.4 | 3–5 |
| Boron | | 0.5–1.8 | 2.5–3.5 |
| Chromium | | | 6–8 |

Although boron is an undesirable element to include in my mixture from the standpoint of intergranular attack on material being brazed, I found its fluxing action was needed to achieve wetting of the braze since even purified hydrogen will not reduce oxides of titanium and aluminum formed on heating alloys including appreciable amounts of those elements. Table IV represents some of the mixtures of powders given in percent by weight. P alloy in Table IV is representative of boron containing alloys useful in adjusting fluidity.

*Table IV*

| Mixture | Percent H-Alloy | Percent N-Alloy | Percent P-Alloy |
|---|---|---|---|
| E | 85 | | 15 |
| F | 95 | 5 | |
| G | 75 | 24 | 1 |

Calculations show the boron content in these mixtures to be less than about 0.5 percent by weight while boron in embrittling alloys or mixtures is about 1–3 percent by weight. Microexamination of René 41 brazed with the mixtures of Table IV disclosed very little grain boundary attack. Such attack was not enough to embrittle the alloy as I determined by tensile testing joints brazed with the mixtures.

Of the satisfactory mixtures shown in Table IV, I prefer to use mixture G for brazing such alloys as René 41 in that such brazing can be conducted in dry hydrogen without the use of fluxes or any special surface preparation.

In addition to their ability to bridge relatively wide gaps and their nonembrittlement of materials being joined, the mixtures of Table IV, as well as my copper base brazing alloy in its broad range, can be used to join components of articles in which it is anticipated that repair brazing or solution heat treating cycles will be required in which the article will be removed from its brazing fixture. I have found that my brazing alloy and its mixtures does not seriously reflow when put through a second brazing cycle, and that they will not melt or move during solution heat treatments such as at about 2000° F.

Altough I have described my brazing alloy and its mixtures with other alloys in connection with specific examples, these examples are to be construed as illustrative of rather than limitations on my alloy and its mixtures in their broad ranges. Those skilled in the art of metal joining will readily understand the modifications and variations of which my invention is capable.

What I claim is:

1. A copper base brazing alloy consisting essentially of, in percent by weight, 30–40 nickel, 2–10 indium, up to about 3 silicon, with the balance copper and incidental impurities.

2. A copper base brazing alloy consisting essentially of, in percent by weight, 30–35 nickel, 2–5 indium, up to 3 silicon, with the balance copper and incidental impurities.

3. A mixture of powdered metal alloys suitable for brazing comprising: about 75–95% by weight of a copper base brazing alloy consisting essentially of, in percent by weight, 30–40 nickel, 2–10 indium, up to about 3 silicon with the balance essentially copper; and 5–25% by weight of a nickel base brazing alloy comprising in percent by weight 1.5–5 silicon, 0.5–3.5 boron, up to about 8 chromium, with the balance essentially nickel.

4. A mixture of powdered metal alloys suitable for brazing comprising: about 75% of a copper base brazing alloy consisting essentially of, in percent by weight, about 30–40 nickel, 2–10 indium, up to about 3 silicon, with the balance essentially copper; about 24% by weight of a second brazing alloy comprising in percent by weight about 0.5–1.8 boron, about 1.5–2.4 silicon, with the balance essentially nickel; and about 1% by weight of a third brazing alloy comprising in percent by weight about 3–5 silicon, 2.5–3.5 boron, 6–8 chromium with the balance essentially nickel.

5. A copper base brazing alloy consisting essentially of, in percent by weight about 35–38 nickel, about 4–6 indium, with the balance copper and incidental impurities.

6. A copper base brazing alloy consisting essentially of, in percent by weight, 35 nickel, 5 indium, with the balance copper and incidental impurities.

References Cited in the file of this patent

UNITED STATES PATENTS

| | | |
|---|---|---|
| 2,142,673 | Hensel | Jan. 3, 1939 |
| 2,755,182 | Cape | July 17, 1956 |
| 2,768,893 | Bredz | Oct. 30, 1956 |
| 2,772,963 | Pease et al. | Dec. 4, 1956 |
| 2,813,790 | Hack | Nov. 19, 1957 |
| 2,854,332 | Bredz et al. | Sept. 30, 1958 |
| 2,891,860 | Wollard | June 23, 1959 |
| 2,911,298 | Woolard | Nov. 3, 1959 |

OTHER REFERENCES

Hansen, Max: "Constitution of Binary Alloys," New York, McGraw-Hill, Inc., 1958, page 591 and page 853.